United States Patent Office 3,504,980
Patented Apr. 7, 1970

3,504,980
COLOR ANALYZER AND SHADE
SORTING APPARATUS
George P. Bentley, Amherst, Charles A. Logan, Sharon,
and Kenneth D. Chickering, Sunderland, Mass., assignors to Kollmorgen Corporation, Garden City, N.Y.,
a corporation of New York
Filed Jan. 26, 1966, Ser. No. 523,075
Int. Cl. G01j 3/46; G06g 7/48, 7/26
U.S. Cl. 356—176                              6 Claims

ABSTRACT OF THE DISCLOSURE

Color computer apparatus is provided to identify the $x$ $y$ coordinate values and the visual tolerance zone for a given set of tristimuli values. Additional computer and display apparatus is provided for receiving the differential tristimulus signals from an operating colorimeter and for computing and displaying the differential chroma error ($\Delta C$) differential lightness error ($\Delta L$) and total differential error ($\Delta E$) in relation to units of visibility for the particular color reference of interest.

---

The present invention relates generally to color measurement apparatus and more particularly to apparatus for computing and displaying the chromaticity and lightness differences between a color reference standard and unknown production samples.

A basic problem that has confronted the users of commercially available colorimeters is that of how to accurately and reliably interpret the output measurement information normally presented in the form of changes in tristimuli values X, Y and Z or changes in the values of the C.I.E. trichromatic coordinates $x$, $y$ and $z$. The problem of interpretation has been two-fold; firstly, one of understanding meter or other indicator readings in terms of actual visual appearance; and secondly, that of understanding what the readings mean in terms of satisfactory visual tolerance or in terms of alterations in chromaticity or lightness that should be made to effect a satisfactory color match between the standard and sample.

A very significant factor that has confounded prior efforts to simplify the interpretation of photometric color measurements is the fact that color space is inherently non-linear in terms of human vision and presently there is no known mathematical conversion that can be applied to the output data of colorimeters or spectrophotometers which will translate that information to a system of numbers that is linear in terms of human vision.

Although several graphical methods have been proposed for analyzing and interpreting color photometric measurements, the application of these various analytical methods to commercial operations has been limited because of the time consumption involved. Whereas some of the proposed mathematical transformations involved could be handled completely automatically by an appropriately programmed relatively complex computer, it is readily recognized that such an approach would be complicated and prohibitively expensive for most commercial applications.

It is a principal object of the present invention to overcome the aforementioned deficiencies of prior art methods and apparatus by providing a relatively simple color analysis computer and display apparatus which can be reliably operated by unskilled personnel to evaluate the output information from a colorimeter in terms of difference values correlated to human visual tolerance.

In accordance with the present invention, color analyzer and shade sorting apparatus is provided comprising a chromaticity display computer (CDC), a color sorter display computer (CSDC) and a color analysis-display computer (CADC) all of which may be utilized cooperatively by an operator to rapidly sort or analyze the output information from a colorimeter in terms of noticeable difference units without the need for mathematical calculations or use of calculation charts.

The CDC unit comprises a relatively simple analogue computer which is adapted to receive and be programmed with colorimeter tristimuli values R, G and B or the C.I.E. tristimuli values X, Y and Z for any given color sample and to derive and display therefrom the chromaticity coordinates $x$ and $y$. The principal function of the CDC is to rapidly locate any given color sample in the chromaticity plane and identify its particular chromaticity and its dominant color wavelength. To this end, a display device is provided having an illuminated C.I.E. chromaticity diagram that is divided into 89 zones as specified by F. T. Simon and W. J. Goodwin in "Rapid Graphical Computation of Small Color Differences," published by Union Carbide Corporation, September 1957, and a simple computer is provided to identify the Simon-Goodwin chromaticity zone for any given set of R, G, B or X, Y, Z input values.

The CSDC provided by the invention comprises a simple computer and output display device which makes possible rapid grouping or sorting of samples having "like" color but differing in either chromaticity or lightness values (or both) into coded groups, the samples in any given group being indistinguishable from one another to an average observer or differing visually by an amount specified by the user. In the preferred embodiment, color difference signals from a ratio-type colorimeter are utilized as input signals to the computer display apparatus provided by the invention. The computer is conveniently programmed by the operator with the proper MacAdam ellipse constants for the Simon-Goodwin zone of the color reference standard and appropriate horizontal and vertical deflection voltages $V_x$ and $V_y$ are produced by the computer and supplied to a calibrated cathode-ray chromaticity-error display tube. The face of the tube is equipped with a sorting calibration chart comprising nine or more separate chromaticity groups which are conveniently number coded for grouping samples into shade categories which, to the human observer, appear to be the same or within a known maximum difference.

As will be explained more fully hereinafter, the sorting computer is adapted to convert or transform the chromaticity difference error signals for use with a circular perceptibility format. Those error signals are advantageously displayed, however, on a cathode-ray tube which is calibrated with a format of squares instead of circles. The cathode-ray display unit may normally be calibrated so that the diagonal of each square equals the diameter of a circle representing one just-noticeable or perceptible color difference unit or some desired multiple thereof.

The color sorter computer also provides a lightness error output signal that is automatically corrected for proper lightness value within the range of Y values from 1 to 100%. This signal actuates a meter that is calibrated to indicate three or more different zones, i.e. normal, light and dark. Typically, the computer display device provides a 27 zone cube of color tolerance with the height and width (9 squares) defining and indicating deviation of chromatictiy between sample and standard and the meter indicating 3 different zones of lightness deviation.

A calibration dial is also advantageously provided to effectively change the dimensions of the squares on the cathode-ray tube face and the lightness meter zones, so as to accommodate different industry standards with respect to acceptable color tolerance. In the preferred embodiment, the dial is calibrated so that the diagonal of each cube is in terms of visual units which are equivalent to MacAdam units.

The CADC provided as part of the present invention also utilizes the color difference signals from a comparator or ratio-type colorimeter as input signals to the computer and analyzer display apparatus. The computer for this unit is also manually programmed with the proper MacAdam ellipse constants for the Simon-Goodwin zone of the color reference standard; however, the horizontal and vertical chromaticity deflection voltages are not converted for circular display as in the CSDC unit but instead retain their original ellipse shape. A calibrated ellipse waveform representing MacAdam units of chromaticity difference is also displayed on the cathode-ray indicator tube on a time-shared basis with the chromaticity error signal.

The chromaticity error appears as a light dot that moves away from the center position in an amount that is a function of $\Delta x$ and $\Delta y$. The shape and phase angle of the displayed ellipse is determined by and corresponds to the Simon-Goodwin zone for the particular color standard. An adjustable control means for varying the size of the displayed ellipse is provided and this means is advantageously calibrated in terms of MacAdam visual chromaticity units. A lightness variation indicator is also provided on the analyzer and means are included for combining the chromaticity and lightness outputs to indicate total color difference between sample and standard in MacAdam units.

An adjustable arrow indicator disposed in front of the cathode-ray tube is advantageously provided to point to and identify the dominant wavelength of the color reference standard on a scale located around the periphery of the tube. If the spot is deflected in the direction of the arrow head, the operator immediately recognizes that the sample is more saturated than the standard and if the spot moves in the opposite direction, the sample is indicated to be less saturated.

Various other objects and features of the present invention will be apparent from the following description considered in conjunction with the accompanying drawings in which.

Figure 1:
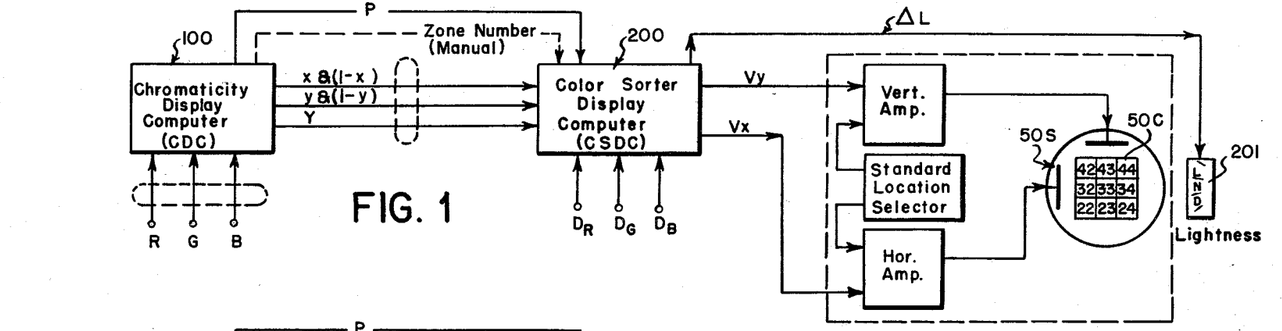
FIG. 1 is a simplified block diagram of the CDC and CSDC display apparatus provided by the invention.

Referring to FIG. 1, there is shown a simplified block diagram of the CDC, CSDC and sorting indicator display units together with an indication of the respective input and output signals supplied to and received from each unit. As shown, the CDC unit 100 is supplied with the tristimuli R, G and B signals from a conventional colorimeter or the C.I.E. tristimuli values X, Y and Z. As will be explained more fully hereinafter in connection with the descriptions of the FIGS. 3–5, the CDC unit is adapted to specifically identify the Simon-Goodwin zone for a given reference standard as viewed by the colorimeter under a given illuminant (e.g. illuminant C). In addition to identifying the Simon-Goodwin zone, the CDC unit supplies functions to the CSDC circuits corresponding to the C.I.E. chromaticity coordinates $x$ and $y$ together with a Y signal and functions corresponding to $(1-x)$ and $(1-y)$. These latter functions are all supplied to the CSDC computer 200.

The CSDC unit 200 is also supplied with differential color signals $\Delta R/R$, $\Delta G/G$ and $\Delta B/B$ from the companion colorimeter. The differential color signals represents the differences in values of color for the respective production samples and the color reference standard. A sequential type colorimeter for providing such differential color signals is described in U.S. Patent 2,686,452 entitled Color Matching Apparatus issued to E. P. Bentley. The description of a colorimeter providing simultaneous differential output color signals appears in an article entitled "Colorede: Color Measurement For Continuous Textile Dyeing" by Edward L. Lewis, published in American Dyestuff Reporter Vol. 53, No. 15, pages 30–35, Issue of July 20, 1964. In operation, unit 200 is manually programmed by the operator with MacAdam ellipse constants for the Simon-Goodwin zone identified for a given color standard. As described generally above, output signals $V_x$ and $V_y$ are supplied to the horizontal and vertical deflection plates of a chromaticity cathode-ray tube indicator 50S. A calibration scale 50C defining nine separate tolerance zone squares 22–44 is advantageously provided on the face of the oscilloscope for group coding purposes. A calibrated standard location selector is advantageously provided to supply D-C centering voltages to both the hroizontal and vertical deflection amplifiers for the cathode-ray tube enabling the operator to locate the beam spot in any desired square of scale 50C. The operator is thereby able to conveniently relocate off-scale samples in a suitable square for coding purposes.

At the same time, a signal $\Delta L$ corresponding to the value of lightness deviation between sample and reference standard is supplied to a calibrated lightness indicator 201.

Figure 2:
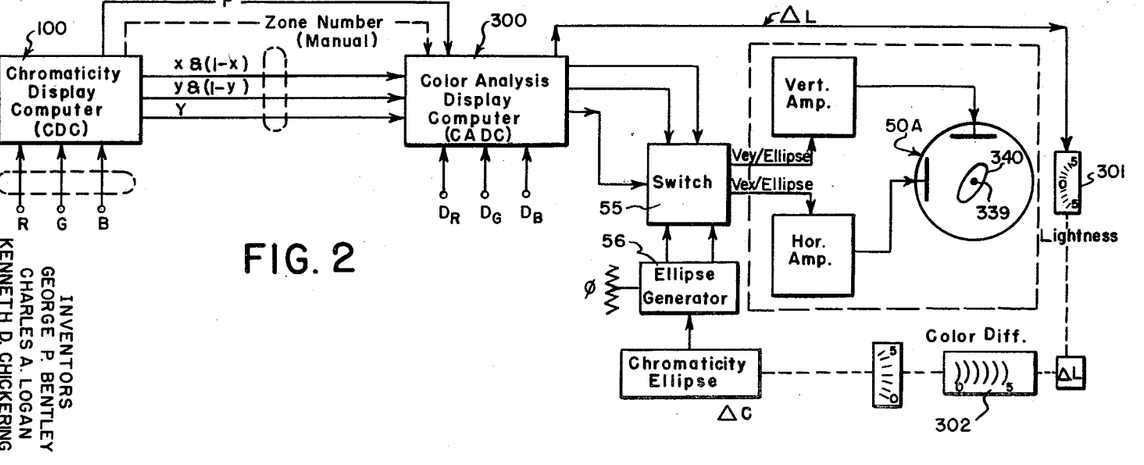
FIG. 2 is a simplified block diagram of the CADC computer and display apparatus in accordance with the invention.

The CDC unit 100 as used in connection with the CADC unit 300, shown in FIG. 2, is identical in function to that of the operation shown in FIG. 1. The principal difference between the operation of the CADC unit 300 with its companion cathode-ray tube display 50A and the CSDC unit described above resides in the different mathematical transformation that is effected in the computer circuits to produce the respective chromaticity signals $V_{ex}$ and $V_{ey}$. As stated above, the CADC unit 300 produces vertical and horizontal deflection signals in ellipse form that are supplied to the vertical and horizontal deflection plates of the cathode-ray tube 50A through an electronic switch 55. A pair of sinusoidal voltages differentially adjustable in phase relationship and adjustable in amplitude are also provided to the input of electronic switch 55 by ellipse generator 56. The operation of this generator and the associated electronic switch will be explained in further detail in connection with the description of FIG. 10.

As further illustrated in FIG. 2, mechanical means are provided for combining the lightness value indicated on calibrated meter 301 with the chromaticity value indicated on the calibrated ellipse size control $\Delta C$ to produce a total color difference readout on indicator 302.

Figure 3:
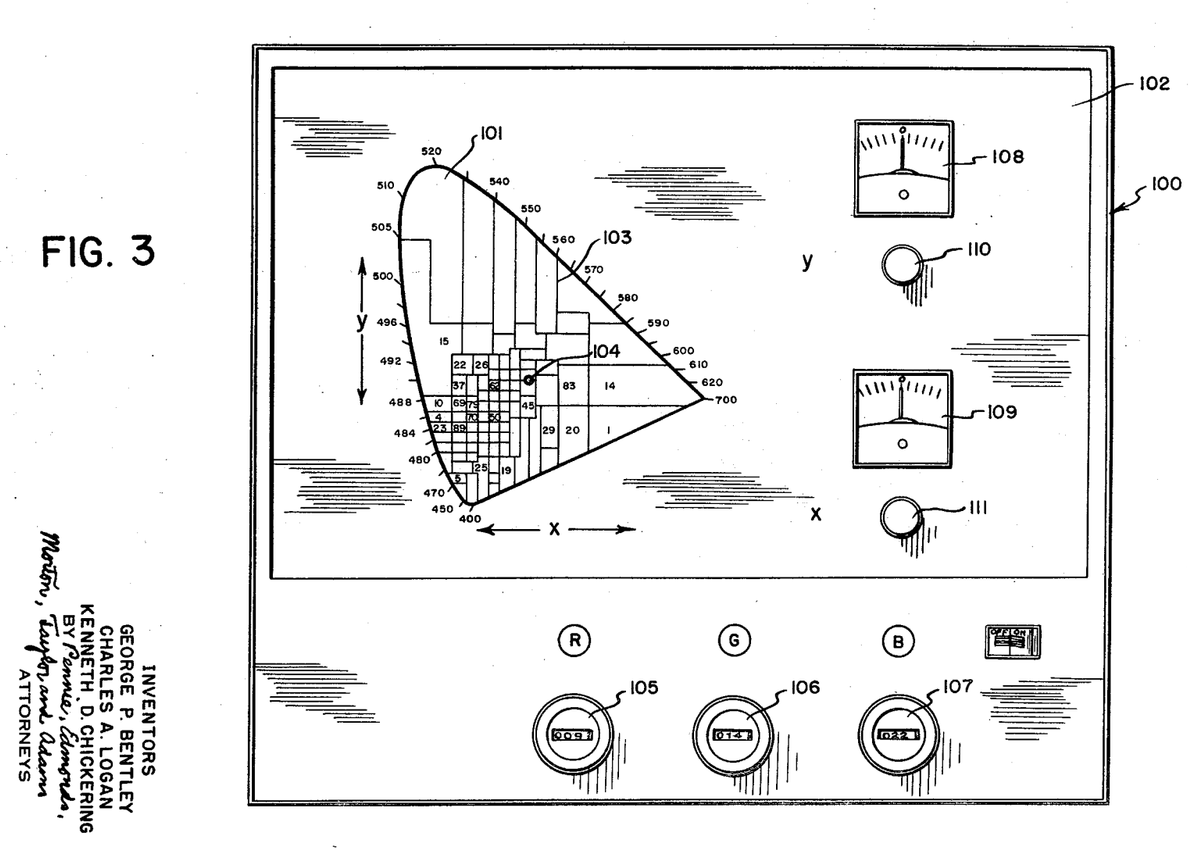
FIG. 3 is a front panel view of the CDC unit.
Figure 4:
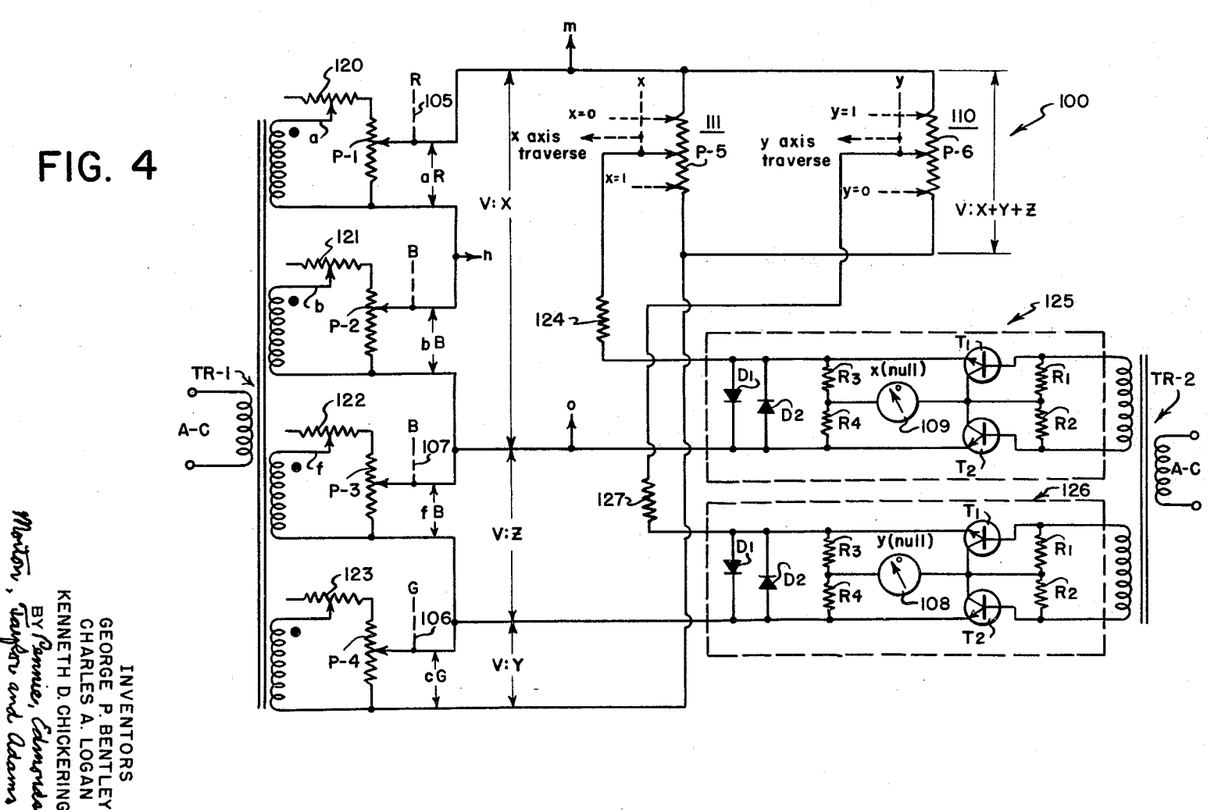
FIG. 4 is a simplified electrical schematic diagram of the CDC unit.

The function and operation of the CDC chromaticity display computer will now be described in further detail in connection with FIGS. 3–5. The basic function of this companion unit to the CSDC or CADC devices is to locate any given color on the C.I.E. chromaticity diagram as a function of the characteristic C.I.E. X, Y and Z tristimuli values for the color. The preferred embodiment illustrated in FIG. 3 includes a rear illuminated colored transparency of the C.I.E. chromaticity diagram 101 mounted on the front panel 102 of the display computer. A coded grid overlay 103 is provided to identify the 89 different Simon-Goodwin zones in the diagram. A pivot point 104 is located on the diagram at a point corresponding to illuminant C and the dominant wavelengths are identified in conventional manner around the periphery of the diagram. Located at the base of the panel are three digital dials 105, 106 and 107 which are provided to control four separate potentiometers in an A-C bridge type computer shown in FIG. 4 and thereby set into the computer the values R, G and B as read from a measuring companion colorimeter. The relationship between the values R, G, B and the values X, Y, Z may be expressed as follows:

$$X = aR + bB$$
$$Y = cG$$
$$Z = fB$$

where $a$, $b$, $c$ and $f$ are appropriate constants for the particular white reference.

To the right of the chromaticity diagram are two null meters 108 and 109 with associated operating control knobs adjusted to give bridge balance null-readings on the respective meters for each new set of tristimuli inputs that is programmed into the R, G, B potentiometer dials 105, 106 and 107 respectively. The simple A-C bridge type computer circuits illustrated in FIG. 4 functions to solve the values of the C.I.E. coordinates $$x = \frac{X}{X+Y+Z}$$

and $$y = \frac{Y}{Y+Y+Z}$$

for any given color having tristimuli inputs programmed into the bridge by the settings of the dial calibrated potentiometers P–1 (R dial 105), P–4 (G dial 106), and P–3 (B dial 107) as shown at the left side of the bridge circuit diagram.

Each of the potentiometers P–1–P–4 is electrically energized by an A-C voltage through the separate windings of transformer TR–1 and through separate variable normalizing resistors 120–123 as illustrated. Appropriate constants $a$, $b$, $c$ and $f$ for the particular white reference used with the colorimeter are mechanicaly introduced with gear train couplers disposed between the dials and associated potentiometers. For illuminant C transmission measurements, typical values are $a = 0.783$, $b = 0.197$, $c = 1.00$ and $f = 1,178$.

For reflectance measurements, typical values for a "Vitrolite" white reference are $a = 0.685$, $b = 0.168$, $c = 0.876$, $f = 1.023$, $X = aR + bB$, $Y = cG$ and $Z = fB$.

It will be apparent that a summation of the input voltages developed across the respective arms and lower terminals of potentiometers P–1–P–4 is applied across the end terminals of the x null setting potentiometer P–5 and the y null setting potentiometer P–6. In applications requiring a more precise representation of X, a fourth input B' derived from a fourth sensor of a four filter type colorimeter may be combined with the R input by programming potentiometer P–2. The characteristics of four filter type colorimeters are discussed on pages 176–201 in the book entitled Color in Business, Science and Industry by Deane B. Judd and Gunther Wyszecki, published by John Wiley & Sons, 1963. The arm of potentiometer P–5 is returned through a limiting resistor 124, and a transistorized null sensing meter 125 to lower terminal O for the input voltage X and when P–5 is adjusted to indicate a null reading, the shaft position for 111 (and P–5) corresponds to the desired coordinate value for $x$.

In like manner, the arm of potentiometer P–6 is returned through limiting resistor 127 and transistorized null sensing meter 126 to the arm of potentiometer P–4 ($V:Y$), and when P–6 is adjusted so that a null reading obtains on meter 108, the shaft position of 110 (and P–6) corresponds to the desired coordinate value of $y$.

The null sensing detector 125 comprises a pair of transistors $T_1$ and $T_2$ the bases of which are energized with A-C voltage from the secondary winding of transformer TR–2. Null meter 109 is connected between the collectors of $T_1$ and $T_2$ and the center-tap of a resistance divider $R_3$, $R_4$ connected between the emitter terminals of $T_1$ and $T_2$. As illustrated, the collector terminals are returned to the center-tap of a resistance divider $R_1$, $R_2$ connecting the respective base terminals together. When the A-C voltages applied to the respective emitter terminals of $T_1$ and $T_2$ are equal in amplitude, the emitter collector currents are equal and balanced resulting in a null reading on meter 109.

The operation of detector 126 is identical to detector 125 and the component parts have accordingly been numbered the same except for the null indicating meter 108.

Figure 5:
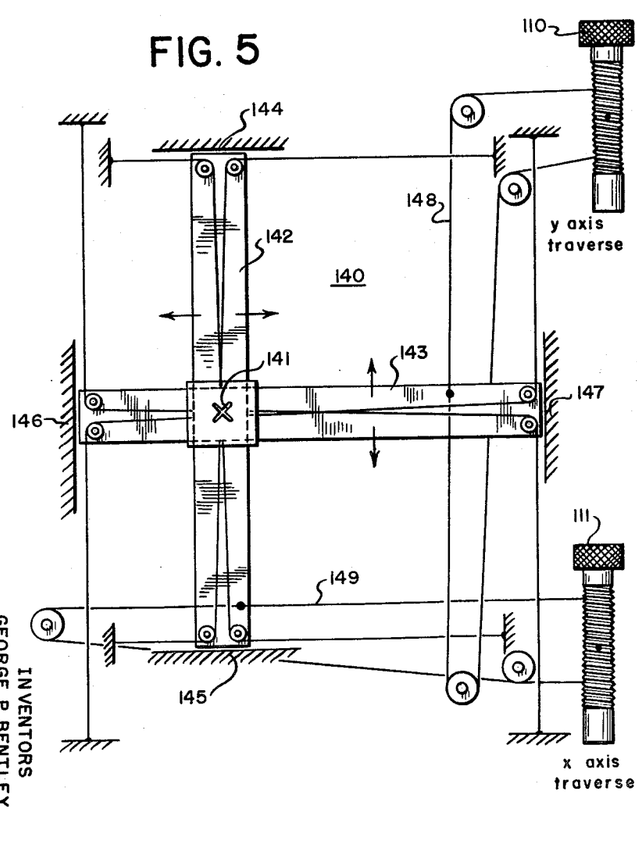
FIG. 5 is a simplified mechanical diagram of the CDC chromaticity zone indicator in the CDC unit.

A simplified schematic diagram of the mechanically driven x–y coordinate indicator 140 that is mounted behind the colored transparent C.I.E. diagram 101 is shown in FIG. 5. The function performed by this indicator driver unit is one of converting the rotational positions of shafts 110 and 111 to linear translation positions corresponding to the derived values of chromaticity coordinates $x$ and $y$. To this end, a rear illuminated crossline indicator 141 is slidably mounted at the junction of drive bars 142 and 143, the former being supported for horizontal translation by guide ways 144, 145 and the latted being supported for vertical translation by guide ways 146 and 147. Bar 143 is thus driven in the y direction by the pulley supported cable 148 through the rotation of knob and shaft 110; and bar 142 is in like manner driven and positioned in the x direction by pulley supported cable 149 through the rotation of knob and shaft 111. Accordingly, a direct computation of the coordinates $x$ and $y$ is effected and at the same time the Simon-Goodwin zone is directly identified by number for the particular color reference standard of interest. By the use of a rhomb line or straight edge pivoted at one end on pivot point 104 and supported so that the straight edge intersects the positioned cross-line indicator 141, the operator may also quickly identify the dominant wavelength indicated at the intercept with the peripheral edge of the diagram. The degree of color saturation or purity may be readily determined by computing the ratio of the distance between pivot-point 104 and indicator 141 to the distance between pivot-point 104 and the peripheral edge of the diagram.

It will be appreciated by those skilled in the art that the CDC unit provided by the present invention may be reliably and rapidly operated by persons having very little technical or operational training. Once having identified the proper Simon-Goodwin zone, relatively simple computers may be readily programmed with appropriate pre-recorded constants by the same operators to control color sorting and analyzing indicators.

Figure 6:
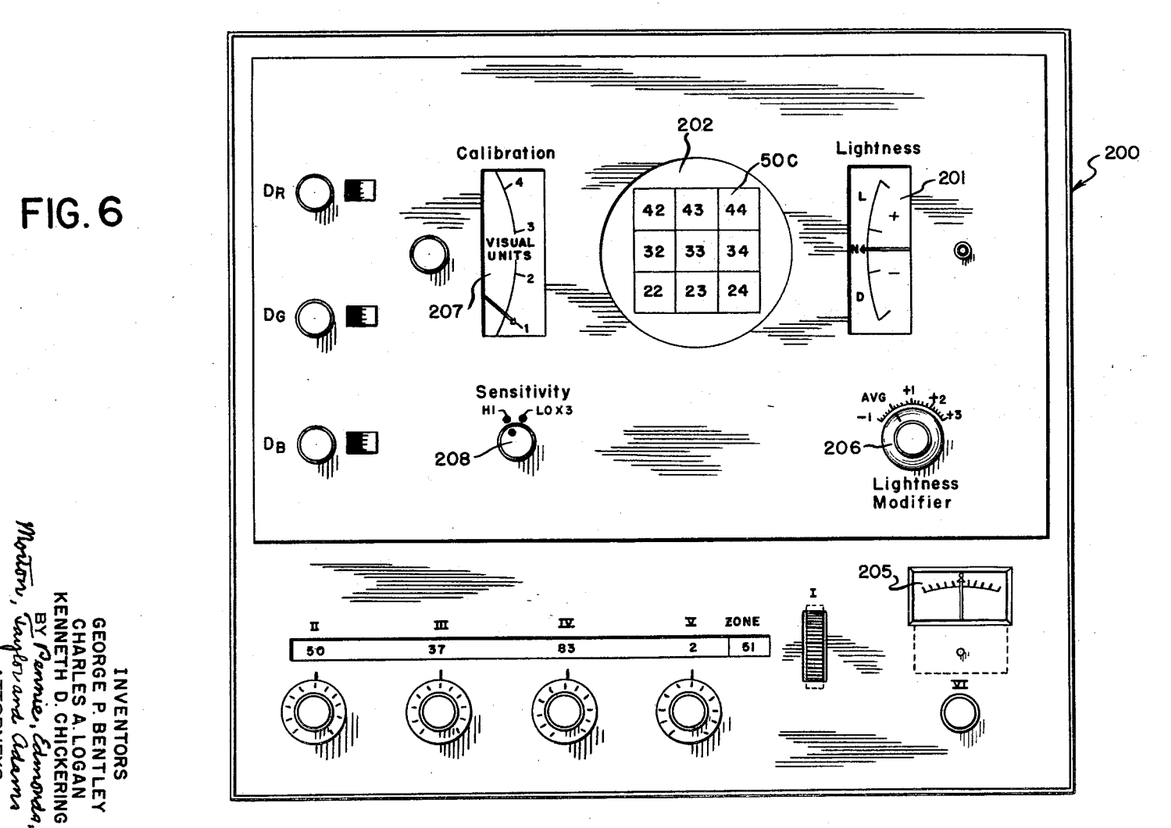
FIG. 6 is a front panel view of the CSDC apparatus provided by the invention.
Figure 7:
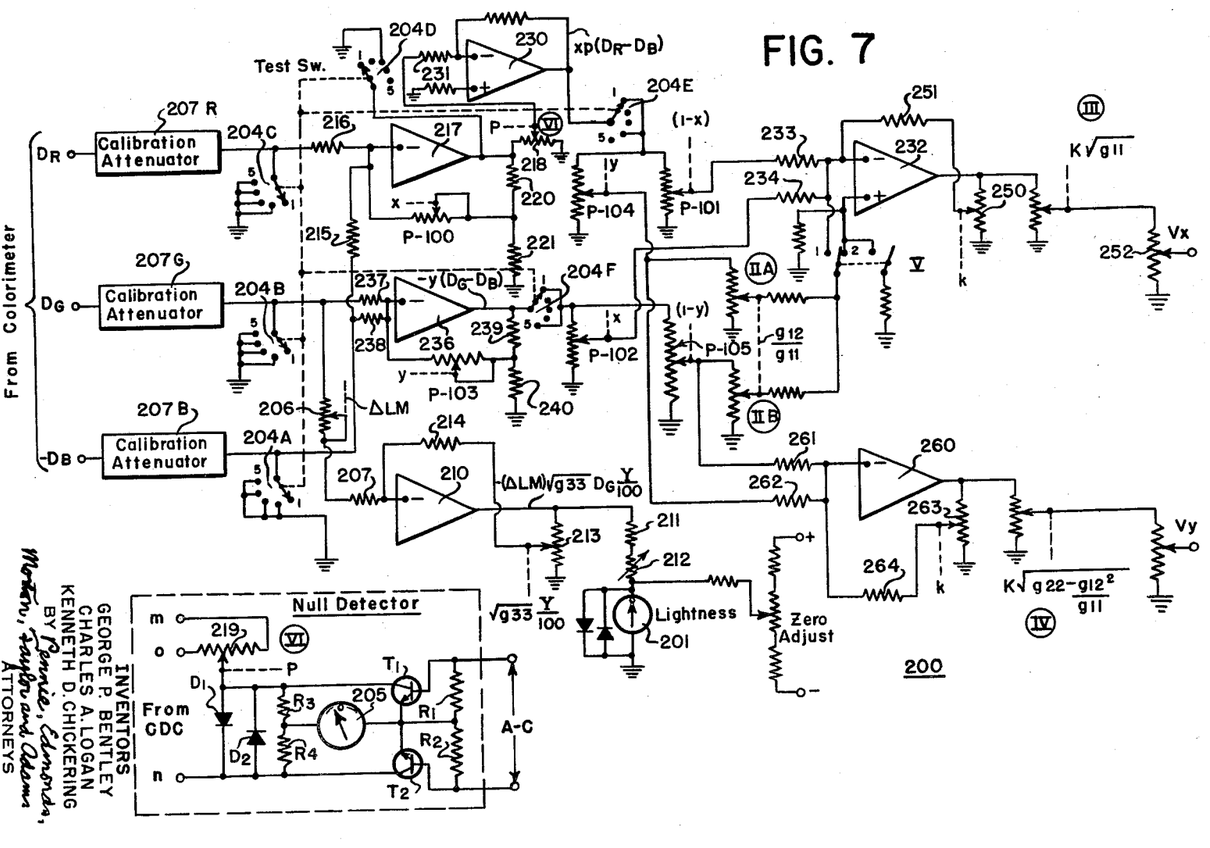
FIG. 7 is a simplified electrical schematic diagram of the CSDC computer.

The CSDC unit 200, which operates in conqunction with the CDC described above, is shown in the front elevation view of FIG. 6 and a simplified block diagram of the computer circuit is shown in FIG. 7. The illustrated preferred embodiment includes a cathode-ray tube 202 onto which is overlayed a square grid structure 50C numbered as shown. The cathode-ray tube functions to display the chromaticity difference $\Delta C$ between a standard color and a simple color. The function of this unit is to permit samples of "like" color but of different shades, i.e. either of different chromaticity or lightness value or both, to be grouped into a three-digid code system, depicting acceptable variation in chromaticity and lightness from a standard of like color, and other samples of like color.

A lightness meter 201 is provided to indicate lightness difference, $\Delta L$, between a standard color and any given sample. In operating the CSDC, the roll chart control knob I is adjusted to show the correct Simon-Goodwin zone number in the window and the calibrated knobs II, III, IV and V are set to each of the corresponding indicated numbers on the roll chart to program the computer amplifier with certain zone constants obtained from the work of MacAdam. A further constant $p$ is required to obtain the C.I.E. quantity $\Delta X/X$. This is programmed into the computer by adjusting the knob VI at the lower right-hand corner of the panel to produce a null reading on the meter 205. An adjustable lightness modified knob 206 permits weighting of the lightness deviation ($-30\%$ to $+60\%$) in the determination of sorting for different applications. Thus, rotation of knob 206 from "average" to plus setting causes the lightness variation to contribute more to the operator's sorting evaluation and this setting would be used, for example, where a very fine line, if any, separates painted sections. Rotating the knob to a minus position decreases the contribution of the lightness error and this setting may be used where relatively large gaps exist between painted samples for example.

An adjustable calibration dial 207 is provided to permit the operator to change the effective diagonal dimension of the squares in 50C as well as the lightness meter areas to values of 1, 2, 3 or 4 visual units weighted by the lightness (Y value) of the stadard. When the calibration dial is set to position 1, the diagonal of any square equals one visual unit or one just noticeable difference unit to an average observer providing the lightness ($\Delta L$) reads zero. With this setting, an average observer will not be able to visually determine differences between samples that all cause the cathode-ray tube dot to fall within any one square or category. When the calibration dial is set at three, for example, samples that cause the C.R.T. spot to fall within any one square can differ as much as three visual units. The calibration scale can also be quickly changed by a factor of 3 from 1–4 visual units to 3–12 units by the simple setting of the sensitivity switch 208 to the low position.

Alternatively, dial 207 may readily be calibrated to read in terms of a cube diagonal representing the combined chromaticity and lightness errors. When the dial is then set to position 1, the diagonal of a cube represents one visual unit or one just noticeable difference unit to an average observer and the diagonal dimension of the squares in 50C represent 0.707 unit. For scale settings of 2, 3 and 4, it is apparent that the corresponding diagonal dimensions of the squares in 50C increases to 1.414, 2.12 and 2.83 units respectively.

Briefly stated, the function of the color sorter computer is to solve the separate parts of the total color difference equation $$\Delta e = \sqrt{(\Delta c)^2 + (\sqrt{g_{33}}\Delta Y)^2} \qquad (1)$$

where $\Delta e$ equals the total color difference between sample and standard in MacAdam units; $\Delta C$ equals the chromaticity difference displayed on the cathode-ray tube and ($\sqrt{g_{33}}\Delta Y$) equals $\Delta L$ the lightness difference displayed on meter 201. The factor $g_{33}$ is a weighting factor that is dependent upon the value of Y for the particular color plus other factors. Suitable values for textiles are defined by Davidson and Hanlon in "Journal of the Optical Society of America," vol. 45, pp. 617–620, August 1955.

The chromaticity difference $\Delta C$ has also been defined as:

$$\Delta C = k\sqrt{g_{11}(dx)^2 + 2g_{12}dxdy + g_{22}(dy)^2} \qquad (2)$$

where $k$ is a weighting factor that is dependent on Y for the color, $g_{11}$, $g_{12}$ and $g_{22}$ are constants determined and defined by MacAdam and Simon-Goodwin, and $dx$ and $dy$ are variations in $x$ and $y$ between sample and standard. It is recognized that the right-hand side of Equation 2 defines an ellipse. MacAdam first determined that human visual tolerance to chromaticity differences between colors is elliptical and that the size and shape of the ellipse varies throughout the chromaticity plane. Simon-Goodwin extended the work of MacAdam by dividing the chromaticity plane into 89 zones in which the ellipse constants $g_{11}$, $g_{12}$ and $g_{22}$ do not cause more than a 12.5% $\Delta C$ chromaticity difference as compared to chromaticity difference determined by the constants for any adjacent zone. The apparatus provided by the present invention utilizes this simplified measurement technique to compare color samples to a reference standard and indicate the difference value in terms of noticeable units.

Both the computer provided for the sorter display and that for the analyzer display are of the relatively simple analogue type and each is adapted to mathematically operate on the differential input signals ($\Delta R/R$, $\Delta G/G$ and $\Delta B/B$) derived from a cooperating colorimeter and produce output error signals that can be unequivocally and objectively evaluated by an operator in terms of noticeable difference units displayed on one or more indicator devices. As has been explained above, the CSDC is adapted to display the chromaticity difference signal on a cathode-ray tube in terms of a noticeability circle instead of a noticeability ellipse, whereas the CADC is programmed to display the chromaticity error in terms of the MacAdam noticeability ellipse.

As has been noted above, a preferred colorimeter to be used with both the CSDC and CADC units is a ratio type which provides color change output information in the form of ratio or difference output signals. For small chromaticity differences, the signal values can be approximately represented by differentials and the respective tristimulus difference voltages can be identified as $D_R = \Delta R/R$, $D_G = \Delta G/G$, and $D_B = \Delta B/B$. The relationship between these values and the C.I.E. quantities is as follows:

$$D_X = pD_R + (1-p)D_B; \; D_Y = D_G \text{ and } D_Z = D_B$$

where $p = aR/X$, $D_X = \Delta X/X$, $D_Y = \Delta Y/Y$ and $D_Z = \Delta Z/Z$.

The respective chromaticity differences can then be expressed as follows:

$$dx = xy(D_X - D_Y) + xz(D_X - D_Z) \qquad (3)$$
$$dy = yz(D_Y - D_Z) + yx(D_Y - D_X) \qquad (4)$$

The relationship between the equations for a circle and an ellipse is as follows:

$$dx'^2 + dy'^2 (\text{Circle}) = k^2[g_{11}dx^2 + 2g_{12}dxdy + g_{22}dy^2](\text{Ellipse}) \qquad (5)$$

The required mathematical transformation for converting the display signals from ellipses to circles is readily effected by utilizing an oblique coordinate system which changes the unit of length along each coordinate axis. This mathematical transformation has been described by David L. MacAdam in an article entitled "Specification of Small Chromaticity Differences" published in "Journal of the Optical Society of America," pp. 18–26, volume 33, January 1943. It can readily be shown that the cathode-ray tube deflection voltages required to produce a circular display are:

$$V_x = Kk\sqrt{g_{11}}[dx + g_{12}/g_{11}dy] \qquad (6)$$

and $$V_y = Kk\sqrt{g_{22} - g_{12}^2/g_{11}}dy \qquad (7)$$

where K is a constant taking into account the physical size of the circle of convenient size to be displayed on the C.R.T. and $k$ is a factor defined by Davidson and Hanlon as ellipse ratios which vary as a function of Y.

Substituting values of $dx$ and $dy$, the deflection voltages required to be produced as the output of CSDC computer of FIG. 7 are shown to be:

$$V_x = Kk\sqrt{g_{11}}[xp(1-x-g_{12}/g_{11}y)(D_R-D_B) + y((1-y)g_{12}/g_{11}-x)(D_G-D_B)] \qquad (8)$$

$$V_y = Kk\sqrt{yg_{22}-(g_{12})^2/g_{11}}[(1-y)(D_G-D_B) - xp(D_R-D_B)] \qquad (9)$$

Operation of the CSDC unit will now be described with reference to FIG. 7. Differential input voltages $D_R$, $D_G$ and $-D_B$ are supplied to the input of the computer through calibration attenuators 207R, 207G and 207B, respectively. A five-pole five position test switch 204 A–E is provided to simplify the completion of routine operational settings of amplifier balance, gain controls, etc. which will not be described herein. The switch is shown set in the operate position 1.

The input signal $D_G$ is supplied to the input of feedback amplifier 210 through the lightness modifier ($\Delta LM$) variable resistor 206 and isolation resistor 207. The output signal from amplifier 210 is supplied to "lightness" meter 201 through fixed resistor 211 and variable calibration resistor 212. The output signal from 210 is also supplied to variable feedback potentiometer 213 which is manually adjusted to vary the feedback through resistor 214 and thereby program in the weighting factor $\sqrt{g_{33}}Y/100$. Thus the lightness signal supplied to the meter 201 is, as indicated, equal to $-\Delta LM(D_G\sqrt{g_{33}}Y/100$.

The first step in developing the horizontal deflection voltage $V_x$ comprises the summing of input signals $-D_B$ and $D_R$ through resistors 215 and 216 at the input of amplifier 217. The output of amplifier 217 is fed to potentiometer 218 which is mechanically coupled to null setting potentiometer 219 controlled by knob VI on the front panel of the CSDC unit. The inputs to this detector are connected to terminals N, M and O of the CDC and the setting of 219 to produce a null meter reading solves for the value of $p$ and directly programs this value into the computer by the setting of potentiometer 218.

The output of amplifier 217 is also connected to a divider comprising resistors 220 and 221 and the signal developed at the junction of these resistors is fed back to the input through variable resistor P100 which is mechanically coupled to and directly programmed by the shaft of the $x$ computer potentiometer in the CDC unit. Potentiometers P101 and P102 are likewise mechanically coupled to and driven by the same shaft to program values of $(1-x)$ and $x$ into the CSDC computer as shown.

The signal developed at the arm of 218 is supplied to the input of feedback amplifier 230 through isolation resistor 231 and the output of 230 is fed to a pair of programmable potentiometers P101 and P104. The arm output of P101 is connected to the input of feedback amplifier 232 through resistor 233 where it is mixed with a signal supplied from the arm of P102 through resistor 234.

The signal obtained from the arm of P102 is supplied from the output of feedback amplifier 236 which produces the signal $-y(D_G-D_B)$ across resistors 239, 240 from inputs $D_G$ and $D_B$ supplied through resistors 237 and 238. Variable feedback resistor P103 together with potentiometers P104 and P105 are driven and programmed by the shaft of the $y$ potentiometer in the CDC unit.

The output signal of amplifier 232 is fed to a variable feedback potentiometer 250 which is adjusted to program the value $k$ into the votage produced for horizontal deflection of the cathode-ray tube display. As shown, a feedback signal to the input of 232 is supplied through resistor 251 from the arm of 250.

A third input signal is also supplied either to the negative polarity input with the signals from 233 and 234 or to the positive polarity input depending upon the programmed setting of switch V on the front panel to position 1 or position 2. This third signal comprises a mixture of signals derived from the outputs of amplifiers 230 and 236 as supplied to ganged potentiometers IIA and IIB which are manually adjusted to program the value of $g_{12}/g_{11}$ into the computer.

As shown in the drawing, the output signal from 230 is supplied to IIA via the arm of P104 programmed to the value of $y$; and the output of 236 is supplied to IIB via P105 programmed to the value of $(1-y)$.

Finally, the factor $K\sqrt{g_{11}}$ is programmed into the computer by adjusting calibrated potentiometer III to the value prescribed for any given Simon-Goodwin zone. The chromaticity horizontal deflection signal provided at the arm of III is conveniently coupled directly to the horizontal gain control 252 of the cathode-ray tube D-C amplifier (not shown).

The vertical chromaticity deflection voltage $V_y$ is derived from the output of feedback amplifier 260. The mixed inputs to this amplifier are supplied from the arms of P104 and P105 through isolation resistors 262 and 261 respectively. The factor $k$ is programmed into the computer by the setting of variable resistor 263 which controls the input feedback to 260 through resistor 264. Both potentiometers 250, and 263 are mechanically coupled to and cam driven by the shaft 106 which sets G potentiometer P-4 in the CDC unit. Each of the amplifiers 210, 217, 230, 232, 236 and 260 is an analogue D-C amplifier having a maximum gain of about 10,000. Amplifiers 217, 230 and 236 are preferably chopper stabilized.

The zone constant $K\sqrt{g_{22}-g_{12}^2/g_{11}}$ is programmed by adjusting potentiometer IV, the arm of which is directly connected to the gain control for the cathode-ray tube vertical deflection amplifier.

From the foregoing description of FIG. 7, it will be recognized that the desired vertical and horizontal chromaticity deflection voltages $V_x$ and $V_y$ are produced as defined in Equations 8 and 9 above.

Whereas in the preferred illustrated embodiment of the CSDC, the chromaticity error signals are supplied to and read out on a cathode-ray tube indicator, it will be appreciated that other readout devices may be utilized where desired such as tape printers, tape perforators, etc.

The computer circuit for the color analysis display unit is substantially similar to the circuit provided in the color sorter unit described above but in certain respects somewhat simpler in that the required deflection voltages are functionally simpler. These voltages for the ellipse display may be defined as follows:

$$V_{ex}=Mkdx$$
$$V_{ey}=Mkdy$$

where M is a constant changing with the zone number and accounting for the change in MacAdam ellipse size for different zones throughout the chromaticity diagram. The values for M are readily computed as the normalized reciprocal of the semi-major ellipse axis for each of the 89 zones. Thus for the elliptical display, these voltages can be expressed as follows:

$$V_{ex}=(Mk)x[(1-x)p(D_R-D_B)-y(D_G-D_B)] \quad (10)$$
$$V_{ey}=(Mk)y[(1-y)(D_G-D_B)-xp(D_R-D_B)] \quad (11)$$

where $p$, $k$, $D_R$, $D_G$ and $D_B$ are the same as defined above in connection with Equations 8 and 9.

As with the case of the CSDC, the CADC is also adapted to be operated conjointly with the CDC and a companion colorimeter unit. Since a great portion of the analyzer computer circuit shown in FIG. 9 is the same as the circuit of FIG. 7, like or similar components are identified with the same numbers and it will be understood that the above explanation for FIG. 7 will be also applicable to this circuit.

In operation, the CADC unit 300 is also manually programmed by the operator's setting of calibrated dials IIA, IIIA, IVA, VA to value pre-recorded on the roll chart for any given one of the 89 zones.

Figure 9:
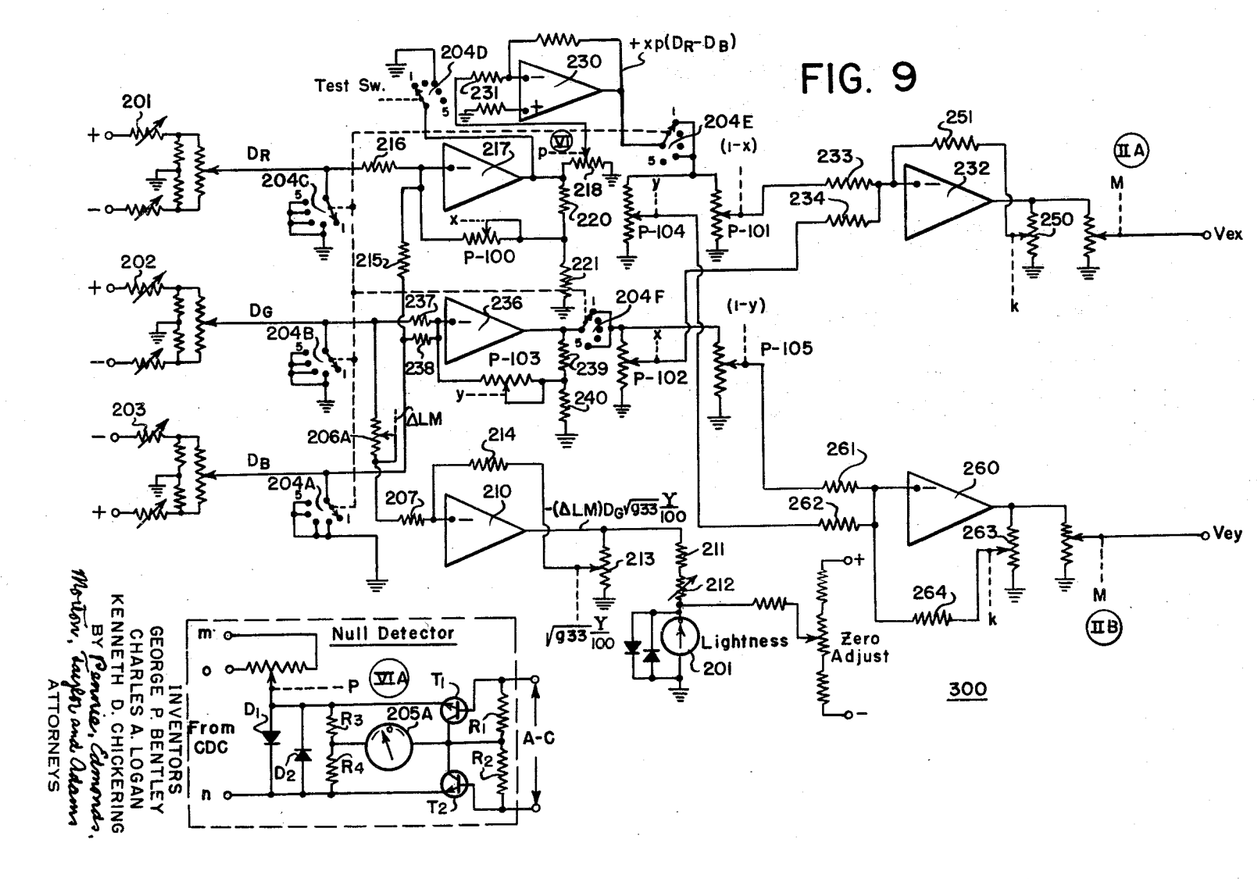
FIG. 9 is a simplified electrical schematic diagram of the CADC computer.

Potentiometer IIA is provided to program the value of M into the horizontal and vertical deflection voltages $V_{ex}$ and $V_{ey}$ as illustrated in FIG. 9. Potentiometer VIA is adjusted to null meter 205A and thereby program the value of $p$ into the computer in the same manner as described above for the operation of the CSDC unit. The lightness modifier dial 206A is normally set to the middle or "Average" position where the calibrated lightness meter 201A will directly read lightness deviation in noticeable or visible units. As described above, the contribution of the lightness error may be modified for different applications by setting dial 206A (ΔLM) to either a plus setting or a minus setting.

Figure 8:
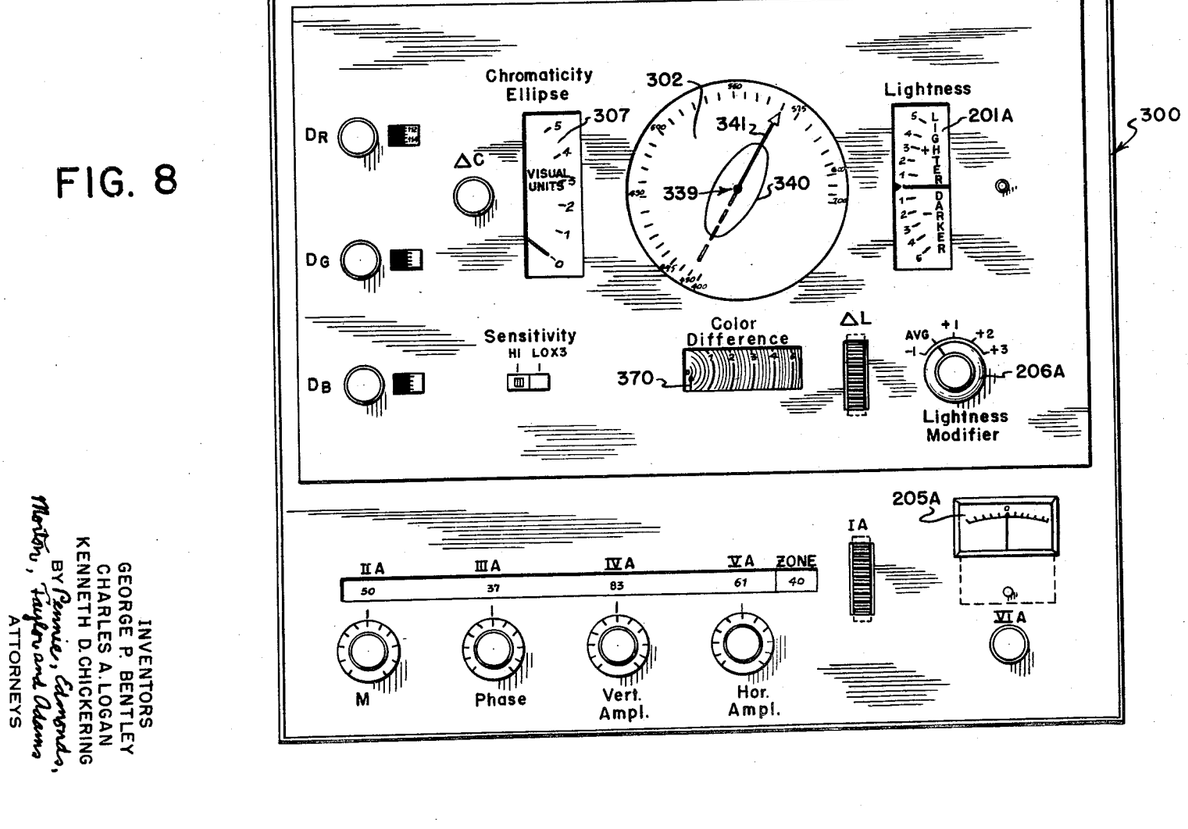
FIG. 8 is a front panel view of the CADC apparatus provided by the invention.
Figure 10:
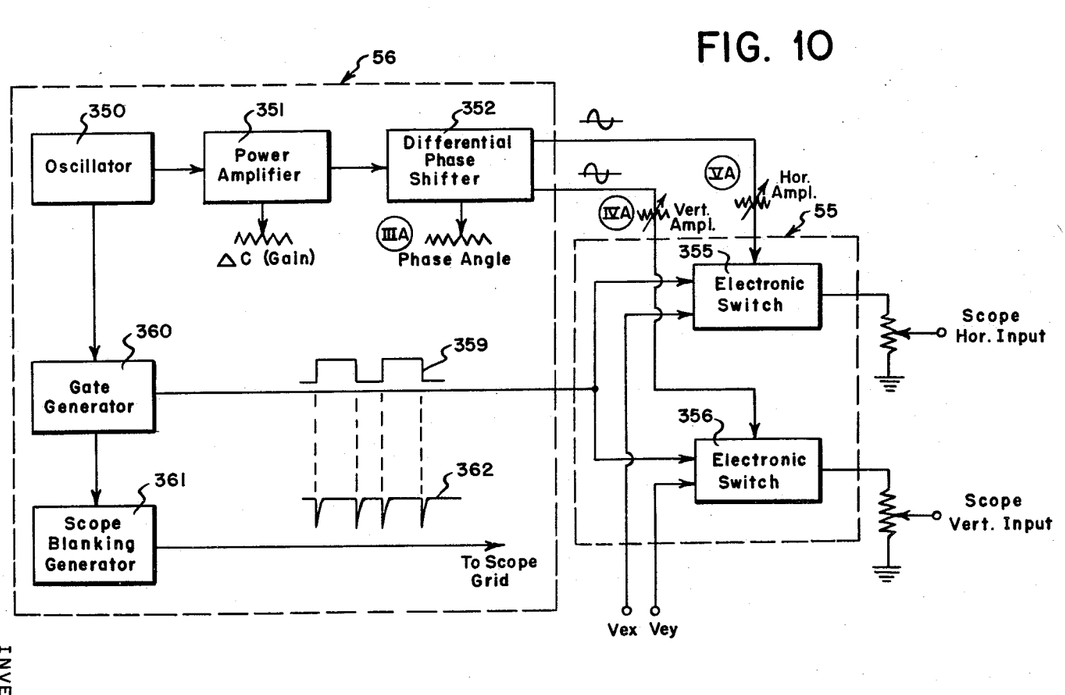
FIG. 10 is a simplified block diagram of the CADC chromaticity ellipse generator and electronic switch.

A simplified block diagram of the ellipse generator 56 and electronic switch 55 employed to provide the time sharing display of the chromaticity error and ellipse on the cathode-ray tube 302 is shown in FIG. 10. The ellipse generator 56 comprises an oscillator 350 which supplies an output sinewave at, for example, 420 c.p.s. to a variable gain power amplifier 351. The gain of 351 is varied by the ΔC knob which is provided to vary the size of the ellipse displayed on tube 302 in terms of calibrated MacAdam visual units as indicated on dial 307 (FIG. 8). The sinewave output of amplifier 351 is fed to a variable differential phase shifter 352 which supplies a first sinewave output to the oscilloscope horizontal input via electronic switch 355 and a programmable horizontal ellipse size control VA. The second sinewave output from 352 is supplied to the oscilloscope vertical input via electronic switch 356 and a programmable vertical ellipse size control IVA. The angular orientation and shape of the Lissajou ellipse displayed on cathode-ray tube 302 is determined by the relative settings of IVA, VA and variable resistor IIIA which determines the relative phase angle difference $\theta$ between the sinewaves supplied to the horizontal and vertical deflection plates of the C.R.T. display. The phase angle $$\theta = \cos^{-1} \frac{-g_{12}}{\sqrt{(g_{11})(g_{22})}}$$

The respective chromaticity error signals $V_{ex}$ and $V_{ey}$ produced by the computer for the CADC unit are also supplied as input signals to electronic switches 355 and 356 and they are alternatively switched on a time sharing basis to the respective oscilloscope deflection amplifiers by the switching pulses 359 produced by gate generator 360 which is triggered by oscillator 350 as shown.

An oscilloscope blanking generator 361 is preferably provided to generate voltage pulses which blank out the C.R.T. beam during its traverse between the position of generating the MacAdam ellipse and the spot position for displaying the chromaticity error or difference signal for a given color sample.

In operation, the chromaticity error or deviation signal causes the cathode ray beam spot 339 to be deflected from its center "zero error" position on the face of the C.R.T. in an amount and direction that varies as a function of the $D_R$, $D_G$ and $D_B$ values programmed into the computer. Along with the dot of light generated by the C.R.T., reference ellipse 340 is displayed simultaneously. The size of the ellipse, which is also centered on the face of the tube, is determined by adjusting the calibrated ΔC knob which is capable of varying the ellipse size from a minimum zero size to a maximum of five noticeable units. The shape and phase angle of the ellipse is dependent on the Simon-Goodwin zone of the standard color as determined by the CDC unit. The required ellipse constants are pre-recorded on the roll-chart, positioned by IA, for each zone and these constants are simply programmed into the ellipse generator by setting calibrated knobs IIIA, IVA and VA to their prescribed values.

As has been pointed out previously, in the preferred embodiment of the CADC unit described herein, the calibrated size of the visual tolerance ellipse is not altered for the different chromaticity zones; instead the amplitudes of the respective horizontal and vertical deflection voltages $V_{ex}$ and $V_{ey}$ are modified by programming the appropriate gain factor M into the computer by the setting of the ganged potentiometers IIA.

A rotatable arrow indicator 341 is mounted on the face of the C.R.T. as illustrated in FIG. 8, and the arrow head is conveniently oriented or directed to the dominant wavelength of the standard color (indicated around the periphery of the tube) as identified by the CDC. An accurate analysis of any given sample can be quickly made by an operator as follows. If the C.R.T. light spot remains in the center of the tube and the lightness meter remains on zero setting, no difference in color shade exists between sample and standard. If the C.R.T. spot remains at the center of the tube but the lightness meter deflects to either a plus or minus value, the sample is lighter or darker in shade than the standard. If the lightness meter remains at zero and the dot deflects in the direction of the arrow head, the sample is more saturated than the standard; if the dot deflects in the direction opposite the arrow head, the sample is indicated to be less saturated than the standard. On the other hand, if the light spot moves to the right or left of the arrow, the operator is alerted to the fact that the sample is different in hue. It will be appreciated that a combination of the foregoing may be indicated by the CADC and readily analyzed by the operator.

In applications requiring a precise evaluation of chromaticity differences, the measurements can be made by adjusting ΔC to change the size of the ellipse until a sector of the ellipse intersects with the dot generated by the C.R.T. The chromaticity error is then read on the chromaticity ellipse scale 307 in terms of visual units weighted by the lightness of the standard color.

Figure 11:
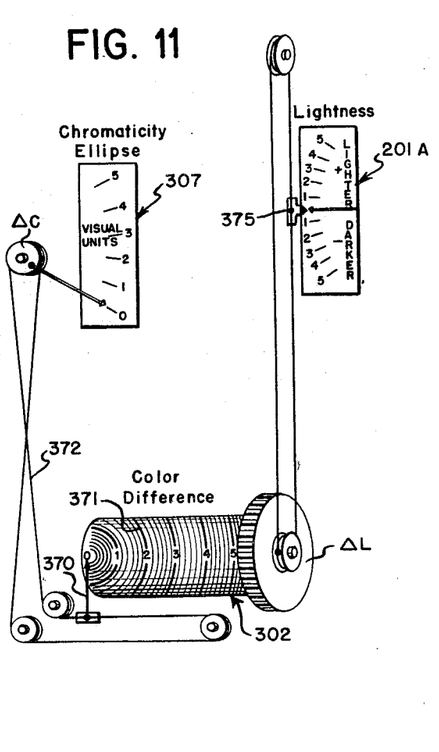
FIG. 11 is a simplified mechanical diagram of a mechanical means for combining and indicating the total color difference between sample and reference standard.

In accordance with a further aspect of the invention, mechanical means is provided in the CADC unit to provide a direct readout of the combined lightness (ΔL) and chromaticity (ΔC) difference values separately indicated on 201A and 307 respectively. The mechanism, which is illustrated in FIG. 11, is adapted to sum the orthogonal vectors ΔC and ΔL and provide a solution of the equation $$\Delta E (\text{total color difference}) = \sqrt{\Delta C^2 + \Delta L^2}$$

Readout of the total color difference value ΔE is provided by pointer 370 slidably mounted adjacent a calibrated cylindrical drum supported chart 371. Chart 371 carries at least five semicircular calibration lines the increasing radii of which correspond to the unit calibration spaces on 307 and 201A. Pointer 370 is coupled to and directly driven in translation by the rotation of the ΔC knob through pully supported drive cable 372. Chart 371 is pivotally supported on a drum and rotatably driven by the rotational adjustment of the ΔL knob to position the cable supported indicator 375 opposite the needle indicator on lightness meter 201A. Rotation of either ΔC above or ΔL above results in the same indication in visual units on 371 as is indicated on either 307 or 201A. When both are rotated, however, the values are vectorally combined to provide the desired value ΔE.

While preferred embodiments of the present invention have been described and illustrated, it will be appreciated by those skilled in the art that various modifications may be made without departing from the scope of the invention.

What is claimed is:

1. Chromaticity display computer apparatus for identifying the Simon-Goodwin chromaticity zone of a reference standard within a C.I.E. diagram, said apparatus comprising
   (a) a C.I.E. chromaticity diagram having $x$ and $y$ rectangular coordinates and chart lines defining the Simon-Goodwin zones, therein,
   (b) cursor means disposed adjacent the surface of said diagram on $x$ and $y$ coordinate drive ways and movable independently on said ways in the directions of the $x$ and $y$ coordinates to identify each of said Simon-Goodwin zones,
   (c) adjustable means for generating separate signals corresponding in amplitude to the R, G and B tristimulus values for a selected reference standard,
   (d) circuit means for deriving from the said R, G and B signals separate signals proportional to the C.I.E. tristimulus values X, Y and Z, (e) circuit means responsive to said X, Y and Z signals for deriving signals proportional to the chromaticity coordinates $$x=\frac{X}{X+Y+Z} \text{ and } y=\frac{Y}{X+Y+Z}$$

(f) means for providing separate output drives having position values corresponding to the chromaticity coordinates $x$ and $y$, (g) and means coupling said cursor to said separate output drives whereby said cursor is moved to said $x$ and $y$ coordinate positions.

2. Color computer and display apparatus adapted to receive input colorimeter signals $D_R$, $D_G$ and $D_B$ corresponding to differences between the colorimeter tristimuli values of a sample and a known color standard and derive therefrom a chromaticity error signal, said apparatus comprising (a) a cathode-ray tube with separate vertical and horizontal deflection amplifiers for displaying the chromaticity error signal on a circular display, (b) means for generating signals corresponding in amplitude to the R, G and B tristimulus values for a selected reference standard, (c) circuit means responsive to the R, G and B signal values and the $D_R$, $D_G$ and $D_B$ tristimuli values for generating a signal $dy$ corresponding in amplitude to the difference in values of the C.I.E. coordinate y for said sample and said known standard, (d) circuit means responsive to said $dy$ signal for modifying the value thereof to $g_{12}/g_{11}dy$ in accordance with the coefficients $g_{12}/g_{11}$ defined by MacAdam and Simon-Goodwin for said color standard, (e) circuit means responsive to the R, G and B signal values and the $D_R$, $D_G$ and $D_B$ tristimuli values for generating a signal $dx$ corresponding in amplitude to the difference in values of the C.I.E. coordinate $x$ for said sample and said known standard, (f) circuit means responsive to said $dx$ and modified $dy$ signals to produce and supply to the horizontal deflection amplifier a signal $$V_x = Kk\sqrt{g_{11}}[dx + g_{12}/g_{11}dy]$$

including adjustable means for modifying the amplitude of $V_x$ in accordance with the ellipse ratio $k$ defined by Davidson and Hanlon and the chromaticity constant $\sqrt{g_{11}}$ defined by MacAdam and Simon-Goodwin for said color standard, (g) circuit means for modifying said $dy$ signal by a factor $Kk\sqrt{g_{22}-g_{12}^2/g_{11}}$ to produce a vertical deflection amplifier signal $V_y=Kk\sqrt{g_{22}-g_{12}^2/g_{11}}dy$ including adjustable means for modifying the amplitude of $V_y$ in accordance with the ellipse ratio $k$ defined by Davidson and Hanlon and the constant $\sqrt{g_{22}-g_{12}^2/g_{11}}$ containing coefficients defined by MacAdam and Simon-Goodwin for said color standard.

3. Apparatus in accordance with claim 2 characterized in that a coded scale is provided on the face of the cathode-ray tube to identify the chromaticity error signal in terms of visual units.

4. Color computer and display apparatus adapted to receive input colorimeter signals $D_R$, $D_G$ and $D_B$ corresponding to differences between the colorimeter tristimuli values of a sample and a known color standard and derive therefrom the chromaticity error signal, said apparatus comprising (a) a cathode-ray tube oscilloscope with separate vertical and horizontal deflection amplifiers for displaying the chromaticity error signal on an elliptical display, (b) means for generating signals corresponding in amplitude to the R, G and B tristimulus values for a selected reference standard, (c) circuit means responsive to the R, G and B signal values and the $D_R$, $D_G$ and $D_B$ tristimuli values for generating a signal $dy$ corresponding in amplitude to the difference in values of the C.I.E. coordinate y for said sample and said known standard, (d) circuit means for generating and supplying to the vertical deflection amplifier a signal $V_{ey}=Mkdy$ including adjustable means for modifying the value of $dy$ to $Mkdy$ in accordance with the MacAdam ellipse size constant M and the ellipse ratio $k$ defined by Davidson and Hanlon, (e) circuit means responsive to the R, G and B signal values and the $D_R$, $D_G$ and $D_B$ tristimuli values for producing a signal $dx$ corresponding in amplitude to the difference in values of the C.I.E. coordinate $x$ for said sample and said known standard, (f) circuit means responsive to said $dx$ signal for producing and supplying to the horizontal deflection amplifier a signal $V_{ex}=Mkdy$ including adjustable means for modifying the value of $dx$ to $Mkdx$ in accordance with the MacAdam ellipse size constant M and the ellipse ratio $k$ defined by Davidson and Hanlon.

5. Apparatus in accordance with claim 4 characterized in that circuit means are provided for generating and supplying separate horizontal and vertical deflection voltages to produce an ellipse on the cathode-ray tube that defines the boundary of visual tolerance for the said color standard, and electronic switch means for alternately switching the chroma error signals $V_{ey}$ $V_{ex}$ and the ellipse generator signals to the respective vertical and horizontal deflection amplifiers to thereby provide a simultaneous time-shared presentation of the ellipse and chroma error signals.

6. Color computer and display apparatus adapted to receive input colorimeter signals $D_R$, $D_G$ and $D_B$ corresponding to differences between the colorimeter tristimuli values of a sample and a known color standard and derive therefrom the lightness and chromaticity error signals, said apparatus comprising (a) a cathode-ray tube oscilloscope with separate vertical and horizontal deflection amplifiers for displaying the chromaticity error signal on an elliptical display, (b) means for generating signals corresponding in amplitude to the R, G and B tristimulus values for a selected reference standard, (c) circuit means responsive to the R, G and B signal values and the $D_R$, $D_G$ and $D_B$ tristimuli values for generating a signal $dy$ corresponding in amplitude to the difference in values of the C.I.E. coordinate y for said sample and said known standard, (d) circuit means responsive to said $dy$ signal for producing and supplying to the vertical deflection amplifier a signal $V_{ey}=Mkdy$ including adjustable means for modifying the value of $dy$ to $Mkdy$ in accordance with the MacAdam ellipse size constant M and the ellipse ratio $k$ defined by Davidson and Hanlon, (e) circuit means responsive to the R, G and B signal values and the $D_{R'}$ $D_G$ and $D_B$ tristimuli values for generating a signal $dx$ corresponding in amplitude to the difference in values of the C.I.E. coordinate $x$ for said sample and said known standard, (f) circut means responsive to said $dx$ signal for producing and supplying to the horizontal deflection amplifier a signal $V_{ex}=Mkdx$ including adjustable means for modifying the value of $dx$ to $Mkdx$ in accordance with the MacAdam ellipse size constant M and the ellipse ratio $k$ defined by Davidson and Hanlon, (g) circuit means for amplifying signal $D_G$ to produce an output lightness error signal $\Delta L=\sqrt{g_{33}}\Delta Y$ including adjustable means for modifying the value of ΔY in accordance with the lightness weighing factor $\sqrt{g_{33}}$, (h) calibrated means for measuring the value of ΔL in visual units, (i) ellipse generator means for supplying separate horizontal and vertical deflection voltages to produce an ellipse on the cathode-ray tube for defining the boundary of visual tolerance for the said color standard, said generator having an adjustable ellipse size control calibrated to measure chromaticity error ΔC in visual units, (j) switch means for alternately switching either the deflection signals $V_{ey}$, $V_{ex}$ or the ellipse generator signals to the respective vertical and horizontal deflection amplifiers to thereby provide a simultaneous time-shared presentation of the ellipse and chromaticity error signals, (k) and indicator means for orthogonally combining the ΔL and ΔC values to provide a total error value ΔE.

References Cited

UNITED STATES PATENTS

| | | | |
|---|---|---|---|
| 2,483,452 | 10/1949 | Berkley | 88—14 |
| 3,060,790 | 10/1962 | Ward | 88—14 |
| 3,328,763 | 6/1967 | Rathbun et al. | 340—172.5 |

MALCOLM A. MORRISON, Primary Examiner

F. D. GRUBER, Assistant Examiner

U.S. Cl. X.R.

235—184, 198; 356—177, 179

PO-1050
(5/69)

UNITED STATES PATENT OFFICE
CERTIFICATE OF CORRECTION

Patent No. 3,504,980  Dated April 7, 1970

Inventor(s) George P. Bentley, Charles A. Logan, Kenneth D. Chickerin

It is certified that error appears in the above-identified patent and that said Letters Patent are hereby corrected as shown below:

Column 2, line 48, "Those" should read -- These --

Column 4, line 31, "hroizontal" should read -- horizontal --

Column 5, line 21, "circuits" should read -- circuit --

Column 5, line 41, "mechanicaly" should read -- mechanically --

Column 5, line 44, "f=1,178" should read -- f=1.178 --

Column 6, line 24, "latted" should read -- latter --

Column 6, line 52, "conqunction" should read -- conjunction --

Column 6, line 60, "simple" should read -- sample --

Column 6, line 63, "digid" should read -- digit --

Column 7, line 5, "modified" should read -- modifier --

Column 7, line 20, "stadard" should read -- standard --

Column 7, line 23, "lightness ($\Delta L$)" should read -- lightness meter ($\Delta L$) --

Column 7, line 42, "increases" should read -- increase --

Column 9, line 16, "$-\Delta LM(D_G \sqrt{g_{33}} Y/100$" should read -- $-\Delta LM(D_G)\sqrt{g_{33}} Y/100$ --

PO-1050
(5/69)

UNITED STATES PATENT OFFICE
CERTIFICATE OF CORRECTION

PAGE - 2

Patent No. 3,504,980      Dated April 7, 1970

Inventor(s) George P. Bentley, Charles A. Logan, Kenneth D. Chickering

It is certified that error appears in the above-identified patent and that said Letters Patent are hereby corrected as shown below:

Page 2

Column 9, line 56, "votage" should read -- voltage --

Column 10, line 64, "value" should read -- values --

Column 12, line 31, "$\Delta$E(total color difference)" should read -- E(total color difference) --

Column 13, line 52, "$g_{22} - g_{12}/g_{11}$ dy" should read -- $g_{22} - g_{122}/g_{11}$ dy --

Column 14, line 19, "Mkdy" should read -- Mk dx --.

Signed and sealed this 10th day of November 1970.

(SEAL)
Attest:

EDWARD M. FLETCHER, JR.
Attesting Officer

WILLIAM E. SCHUYLER, JR.
Commissioner of Patents